A. A. GLASS.
TOOL FOR DRESSING EMERY WHEELS AND THE LIKE.
APPLICATION FILED FEB. 18, 1921.

1,387,847.

Patented Aug. 16, 1921.

Arthur A. Glass
INVENTOR,

BY Robert B Killgore
ATTORNEY.

UNITED STATES PATENT OFFICE.

ARTHUR A. GLASS, OF NEW YORK, N. Y.

TOOL FOR DRESSING EMERY-WHEELS AND THE LIKE.

1,387,847.   Specification of Letters Patent.   Patented Aug. 16, 1921.

Application filed February 18, 1921. Serial No. 446,069.

*To all whom it may concern:*

Be it known that I, ARTHUR A. GLASS, a citizen of the United States, residing at New York city, in the county of New York and State of New York, have invented certain new and useful Improvements in Tools for Dressing Emery-Wheels and the like, of which the following is a specification.

My invention relates to tools for dressing emery or other grinding wheels and it is my object to produce a chuck or device for holding a diamond securely, in which the position of the stone may be quickly and easily changed, in which the stone will not shift its position while being locked in place, which will not be affected by heat generated in dressing the wheel, and in which the stone will be securely held when in use.

Figure 1:
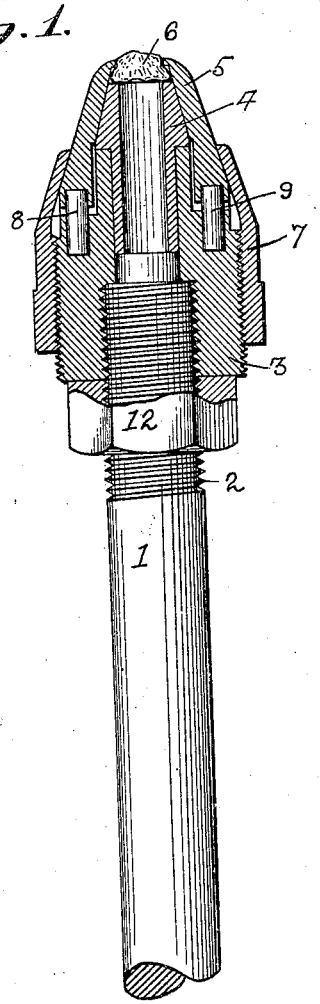
Figure 2:
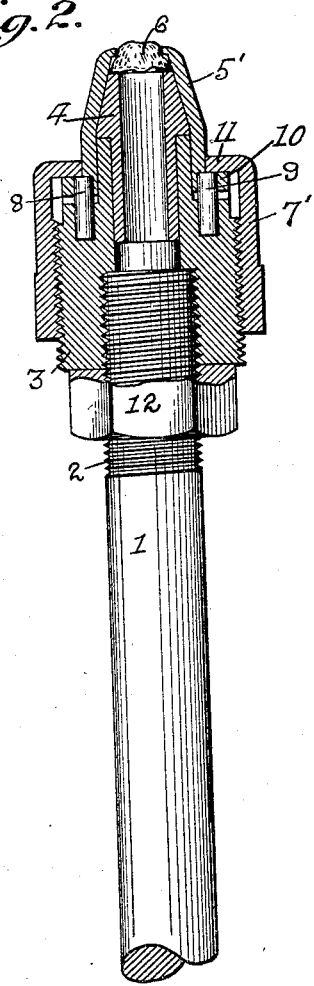

In the drawing Figure 1 is a view, partly in section, of my improved chuck and Fig. 2 is a like view of a modification.

The tool consists of a shank 1, threaded at 2, with a hollow body 3 internally threaded at the base to be screwed to the shank 1 and externally threaded to receive a clamp ring.

A shouldered tube 4, preferably made of high speed tool steel so as to be unaffected by heat, is slipped into the upper end of hollow body 3 and a hollow cap 5 with an open end is slipped over the shouldered tube 4, the diamond 6 being laid between the end of the shouldered tube 4 and the cap 5 with a small portion exposed through the opening on the end of the cap 5. A clamp ring 7, internally threaded, is then screwed to the body 3.

In the form shown in Fig. 1 the cap 5 is tapered on the outside and the upper end of the clamp ring 7 is internally tapered so that on screwing the clamp ring down the hollow cap is forced down on the diamond and locks it between the end of the tube 4 and the edge of the aperture in the cap 5 with the diamond slightly protruding through the opening in the cap.

To prevent a twisting movement of the cap 5 and the accidental displacement of the diamond after it has been positioned on the end of the tube 4 two pins 8 and 9 are secured to the cap and enter recesses in the body 3.

In the form shown in Fig. 2 the cap 5' is shouldered at 10 and the clamp ring 7' is shouldered at 11 whereby an even thrust is produced on the cap 5' when the diamond is being clamped.

A lock nut 12 may be used to hold the chuck securely to the shank 1.

In use the heat generated in dressing a wheel is carried through the high speed tool steel tube 4 to the body of the chuck and dissipated without injuring the tool.

I claim:—

1. A tool for dressing emery wheels and the like comprising an externally threaded hollow body, a tube partly within said hollow body and adapted to support a cutting stone, an open end cap on said tube and an internally threaded clamp ring over said cap engaging the body threads whereby the cutting stone is clamped between the tube and cap and projects through the latter.

2. A tool for dressing emery wheels and the like comprising an externally threaded hollow body recessed at its upper edge, a shouldered tube partly within said body and adapted to support a cutting stone, an open end cap over said tube, pins on said cap entering the recesses on the body and an internally threaded clamp ring over said cap and engaging the body threads whereby the cutting stone is clamped between the tube and cap and projects through the latter.

3. A tool for dressing emery wheels and the like comprising an externally threaded hollow body, a shouldered tube partly within said body and adapted to support a cutting stone, an open end cap provided with a bottom shoulder over said tube and an internally threaded, flanged clamp ring over said cap engaging the body threads whereby the stone is clamped between the tube and cap and projects through the latter.

In testimony whereof I have affixed my signature.

ARTHUR A. GLASS.